(12) United States Patent
Salazar

(10) Patent No.: US 8,241,405 B2
(45) Date of Patent: Aug. 14, 2012

(54) FLUID SCRUBBER AND SPRAY BOOTH INCLUDING THE FLUID SCRUBBER

(75) Inventor: Abraham J. Salazar, Lexington, KY (US)

(73) Assignee: The University of Kentucky Research Foundation, Lexington, KY (US)

(*) Notice: Subject to any disclaimer, the term of this patent is extended or adjusted under 35 U.S.C. 154(b) by 352 days.

(21) Appl. No.: 12/445,833

(22) PCT Filed: Oct. 22, 2007

(86) PCT No.: PCT/US2007/082067
§ 371 (c)(1),
(2), (4) Date: Apr. 16, 2009

(87) PCT Pub. No.: WO2008/051897
PCT Pub. Date: May 2, 2008

(65) Prior Publication Data
US 2010/0212498 A1 Aug. 26, 2010

Related U.S. Application Data

(60) Provisional application No. 60/862,334, filed on Oct. 20, 2006.

(51) Int. Cl.
*B01D 53/14* (2006.01)
*B01D 45/00* (2006.01)
(52) U.S. Cl. ......... 95/219; 96/301; 96/314; 55/DIG. 46; 118/326
(58) Field of Classification Search ............... 55/DIG. 46
See application file for complete search history.

(56) References Cited

U.S. PATENT DOCUMENTS

| 4,205,968 | A | * | 6/1980 | Hakala ........................... 95/219 |
| 4,483,698 | A | | 11/1984 | Kuchenthal et al. |
| 4,872,892 | A | * | 10/1989 | Vartiainen et al. ............. 55/345 |
| 5,269,637 | A | * | 12/1993 | Gomes, Jr. .................... 406/173 |
| 6,024,796 | A | * | 2/2000 | Salazar et al. ................ 118/326 |
| 6,093,250 | A | * | 7/2000 | Salazar et al. ................ 118/668 |
| 6,481,645 | B1 | | 11/2002 | Taylor-McCune et al. |
| 2002/0007736 | A1 | * | 1/2002 | Hearn et al. ................... 96/209 |

(Continued)

FOREIGN PATENT DOCUMENTS

EP   1 258 294 A2   11/2002

OTHER PUBLICATIONS

Citing the definition of "projection" as found in Free Online Dictionary and Thesaurus. http://www.thefreedictionary.com/projection (Jul. 21, 2011).*

(Continued)

*Primary Examiner* — Duane Smith
*Assistant Examiner* — Pankti Patel
(74) *Attorney, Agent, or Firm* — King & Schickli, PLLC

(57) ABSTRACT

A wet scrubber for scrubbing a fluid. The wet scrubber may include an inlet for receiving the fluid and a vortex chamber, in communication with the inlet, for causing at least a portion of the fluid to circulate. The wet scrubber may also include at least one diffuser for exhausting the fluid from the vortex chamber, the diffuser configured to substantially prevent fluid exhausted from the diffuser from recirculating back into the diffuser. A paint booth and a method of scrubbing a fluid are also provided.

25 Claims, 6 Drawing Sheets

U.S. PATENT DOCUMENTS

2003/0150325 A1* 8/2003 Hyppanen ................. 95/271

OTHER PUBLICATIONS

Salazar, Abraham J. et al., Performance Evaluation of Automotive Downdraft Booth Scrubbers Through the Use of Computational Fluid Dynamics, Presented at SURCAR 05, Cannes, France, Jun. 2-3, 2005, 12 pgs.

Salazar, Abraham J. et al., CFD Evaluation on the Performance of Vortecone-Type Scrubbers Against Two Commercial Alternatives, Presented at Painting Technology Workshop (PTW2003), Hilton Suites, Lexington, Kentucky, Oct. 1-2, 2003, 37 pgs.

Salazar, Abraham J. et al., Computational Fluid Dynamics Evaluation of the Performance of Automotive Downdraft Booth Scrubbers, Submitted to: Separation & Purification Technology, Dec. 2005, 26 pgs.

Salazar, Abraham J. et al., Performance Evaluation of Automotive Downdraft Booth Scrubbers Through the Use of Computational Fluid Dynamics, SURCAR 2005, 14 pgs.

* cited by examiner

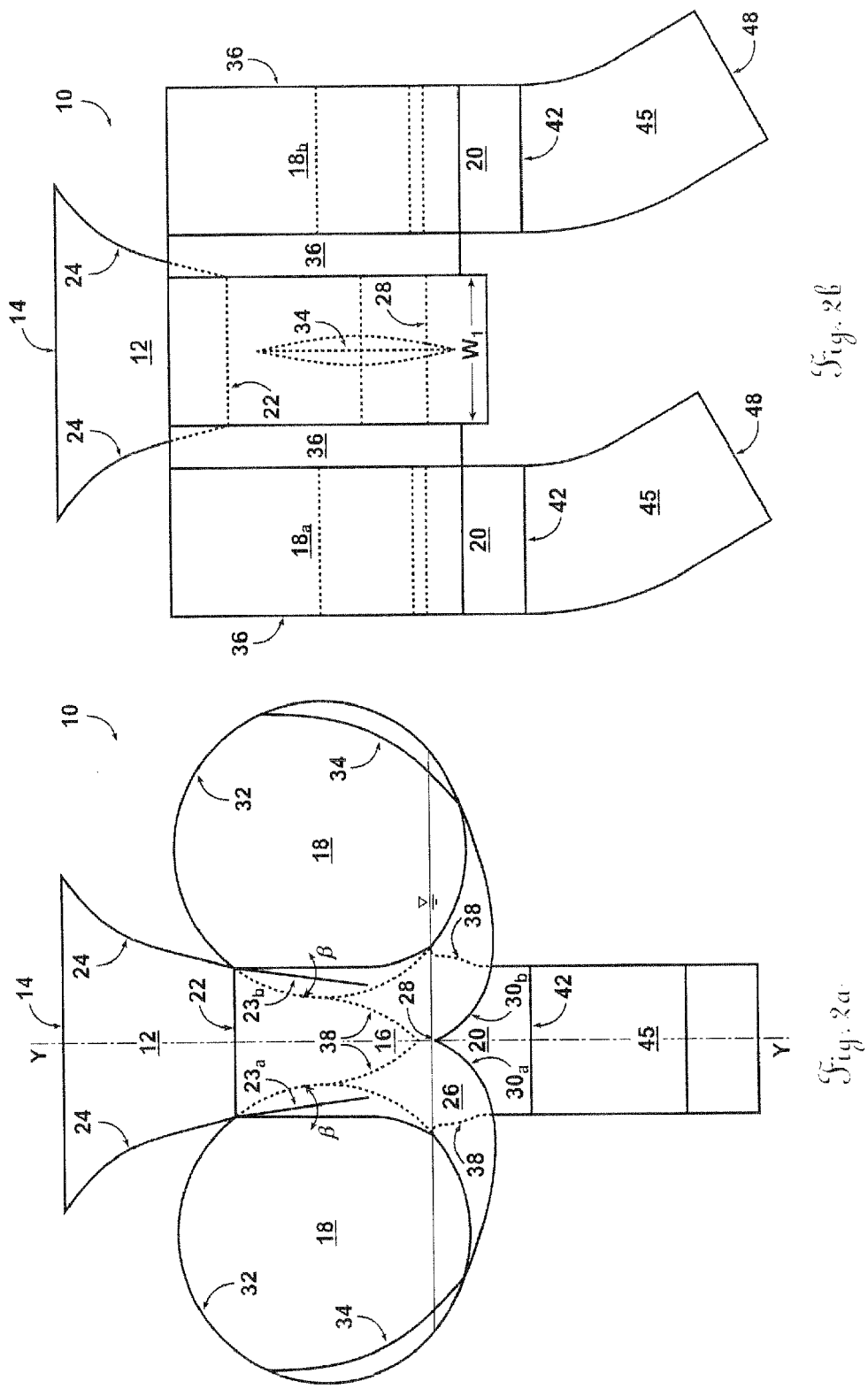

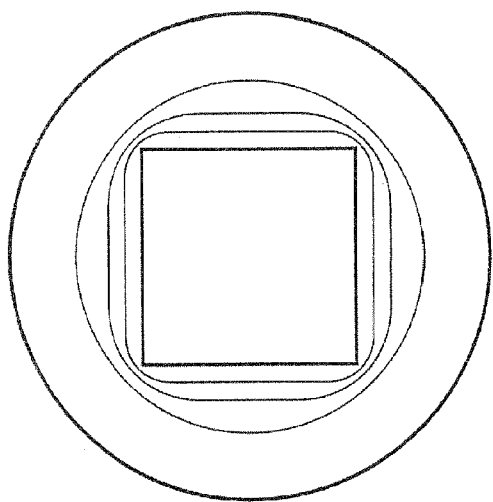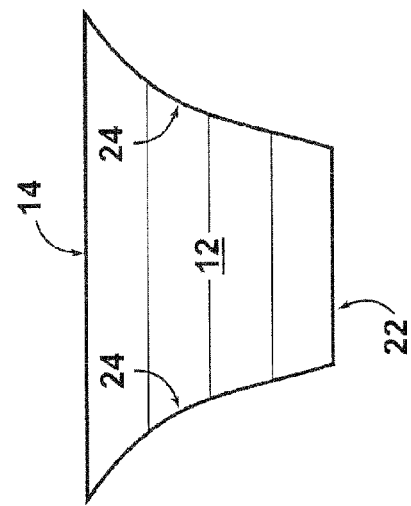
Fig. 3b.
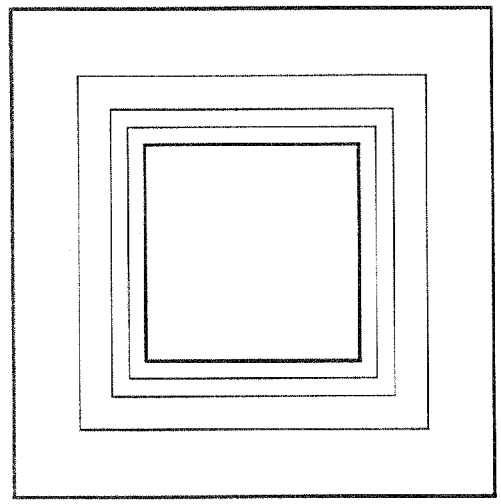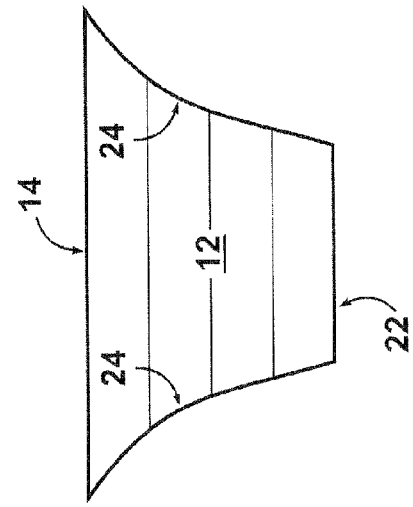
Fig. 3a.

FLUID SCRUBBER AND SPRAY BOOTH INCLUDING THE FLUID SCRUBBER

This application claims the benefit of U.S. Provisional Patent Application Ser. No. 60/862,334, filed Oct. 20, 2006, the disclosure of which is incorporated herein by reference.

TECHNICAL FIELD

The present invention relates to a scrubber for separating/removing particles from a fluid and, more specifically, to a wet scrubber which captures overspray in a paint spray booth and separates/removes liquid or solid particles contained in an airflow.

BACKGROUND OF THE INVENTION

Many industrial processes require fluid application to a material. For instance, applying a surface coating (e.g., paint) to an object requires fluid (such as a liquid or powder slurry) to be sprayed or otherwise delivered to the material. Typically, this fluid application will occur in a contained environment that enables control of the fluid. For example, paint is often applied in a paint spray booth that allows control of the atmospheric conditions and containment of the paint. Inherent in the paint spraying process is overspray, that is, paint that does not adhere to the object being painted and floats in the air as a mist. In order to provide a safe working environment and a high quality finished product, paint spray booths require a substantially continuous supply of clean, fresh air, which also assists with discharge of the overspray from the booth.

Various configurations of spray booths have been developed for different fluid application processes and discharge of the overspray. These booths are often classified by the direction of the airflow in the spraying area. For instance, cross-draft booths include an airflow which moves parallel to the floor from behind the operator toward a dry filter or a water curtain. Downdraft booths have an airflow which moves from the ceiling vertically downward to an exhaust system below the floor. Semi-downdraft booths include an airflow which moves in a diagonal direction in the booth towards an exhaust.

Since the overspray contains paint particles, it is important to filter or otherwise clean this air before discharging it back into the environment. Several methods have been developed for separating the paint mist from the air exhaust stream. For instance, a dry method results in air entrained with paint being forced through a dry filter or screen which absorbs or otherwise captures the paint particles. A wet method requires the air entrained with paint to contact and be mixed with another fluid, such as water, so that the paint particles are captured by the fluid.

Due to the large amount of paint used by most industrial paint facilities, such as automotive plants, the wet method in a downdraft booth is the preferred configuration. These booths generally have a wet scrubber that captures the fluid overspray and assists with separating the paint particles from the air.

Over time, various configurations of wet scrubbers have been developed in attempts to increase the efficiency of the particle separation and minimize operating costs for the paint facility. For instance, a Venturi type of scrubber utilizes a restriction or Venturi to accelerate the paint laden air, generate turbulence, and break-up the supply water (or the capturing fluid) running along its walls into small drops that capture or trap within the droplets the paint particles in the exhaust air. Another type consists of an elongated tube with a nozzle positioned at the tube exit, whereby water flows downward along the walls of the tube and into a pool of liquid contained within a capturing chamber, in which turbulence is generated and the paint particles in the air are captured or trapped within the water. Although these designs capture the overspray and separate some of the paint particles, they use a large amount of energy and/or allow a sub-optimal amount of paint particles to penetrate the system and be exhausted to the outside air. More modern scrubber designs utilize vortex chambers to capture and separate paint particles and volutes to decelerate the air flow and recover pressure. Although these designs capture a greater amount of paint particles than the venturi or tube types, the volutes permit back flow of the exhaust, which perturbs the vortex chamber flow, thereby decreasing both capturing efficiency and pressure recovery, that is, increasing effective pressure drop. This back flow in the volutes generates recirculation zones that reduce the effective flow area precluding appropriate deceleration of the flow and, hence, reducing pressure recovery. In addition, the energy required to sustain the recirculation zones is taken away from the flow, therefore, reducing the recoverable pressure energy.

Accordingly, the particle separation arts have need for a more efficient scrubber; that is, a scrubber that captures or traps a desired amount of particles (increasing capturing efficiency), while minimizing pressure drop.

SUMMARY OF THE INVENTION

In accordance with one aspect of the invention, a wet scrubber for scrubbing a fluid is disclosed. The wet scrubber may include an inlet for receiving the fluid and a vortex chamber, in communication with the inlet, for causing at least a portion of the fluid to circulate. The wet scrubber may also include at least one diffuser for exhausting the fluid from the vortex chamber, the diffuser configured to substantially prevent fluid exhausted from the diffuser from recirculating back into the diffuser. In one embodiment, the vortex chamber is substantially cylindrical and one diffuser is positioned at an end of the vortex chamber. In another embodiment, the vortex chamber may include a projection for dividing the vortex chamber into two sub-chambers. The sub-chambers may be substantially equal sized and each of the at least one diffuser is in communication with a separate sub-chamber. The wet scrubber may also include a mixing chamber having an impingement pool located between the inlet and the vortex chamber.

In accordance with another aspect of the invention, a wet scrubber for scrubbing a fluid is disclosed. The wet scrubber may include an inlet that receives the fluid and first and second vortex chambers, in communication with the inlet, for causing at least a portion of the fluid to circulate. Each vortex chamber may include a first outlet arranged such that fluid exiting the outlet of the first vortex chamber engages fluid exiting the outlet of the second vortex chamber. The first and second vortex chambers may be substantially cylindrical and the outlets may be positioned at an end of each vortex chamber. In one embodiment, each vortex chamber includes a second outlet, wherein the first and second outlets are positioned at different ends of the vortex chamber. The wet scrubber may also include a projection in each vortex chamber, wherein each projection divides the vortex chamber into substantially equal sized sub-chambers. The wet scrubber may also include a mixing chamber in communication with the inlet and the first and second vortex chambers. The mixing chamber may include a divider for dividing the fluid prior to entering the first and second vortex chambers. In one embodiment, the mixing chamber includes an impingement pool for collecting a portion of the fluid that enters the inlet.

In accordance with another aspect of the invention, a wet scrubber is disclosed. The wet scrubber may include a conduit having an inlet that receives a fluid and an outlet and a mixing chamber for receiving fluid from the outlet of the conduit, the mixing chamber including a pool for receiving a portion of the fluid. The wet scrubber may also include two vortex chambers in communication with the mixing chamber, each of the vortex chambers including a projection for dividing each vortex chamber into two sub-chambers. The wet scrubber may also include a diffuser in communication with each sub-chamber, the diffusers configured to substantially prevent fluid exhausted from the diffusers from recirculating into the diffusers. In one embodiment, the conduit is positioned substantially in a center of the wet scrubber. Also, the mixing chamber may include a divider for dividing the fluid. The divider may have a width substantially equal to the width of the outlet of the conduit. In one embodiment, each vortex chamber is substantially cylindrical and the diffusers are positioned to enable fluid exiting each sub-chamber to engage fluid exiting one of the other sub-chambers. The wet scrubber may also include an exhaust in communication with at least one of the diffusers to direct the fluid away from the wet scrubber. The wet scrubber may also include an exhaust extension for directing the fluid exiting the exhaust in a direction away from the wet scrubber.

In accordance with another aspect of the invention, a paint booth is disclosed. The paint booth may include a spraying section where paint is directed toward an object and a capturing section communicating with the spraying section. The capturing section may include a wet scrubber including an inlet that receives a fluid containing paint particles and first and second vortex chambers, each in communication with the inlet, for causing at least a portion of the fluid to circulate. Each vortex chamber may include an outlet, such that fluid exiting the outlet of the first vortex chamber engages fluid exiting the outlet of the second vortex chamber. The paint booth may also include an exhaust enclosure that encloses an exhaust of the wet scrubber and receives fluid from the exhaust. Also, the paint booth may include a sluice for receiving fluid from the exhaust enclosure.

In another aspect of the invention, a method of scrubbing a fluid containing paint particles is disclosed. The method may include directing the fluid to first and second vortex chambers, causing the fluid to circulate within the first and second vortex chambers, and directing fluid from the first and second vortex chambers to a point where the fluid from the first vortex chamber engages fluid from the second vortex chamber to cause further mixing of the fluid. The method may also include the step of mixing the fluid prior to the directing the fluid to the first and second vortex chambers. Also, the method may include the steps of dividing the fluid prior to directing the fluid to the first and second vortex chambers and further dividing the fluid after the fluid enters the first and second vortex chambers.

BRIEF DESCRIPTION OF THE DRAWINGS

The accompanying drawings, incorporated in and forming a part of the specification, illustrate several aspects of the present invention, and together with the description serve to explain the principles of the invention. In the drawings:

FIGS. 2a and 2b are schematic frontal and side views of one embodiment of a scrubber of the present invention;

FIGS. 3a and 3b are schematic top and side views of two embodiments of an inlet conduit for a scrubber of the present invention;

DETAILED DESCRIPTION OF THE INVENTION

Figure 1:
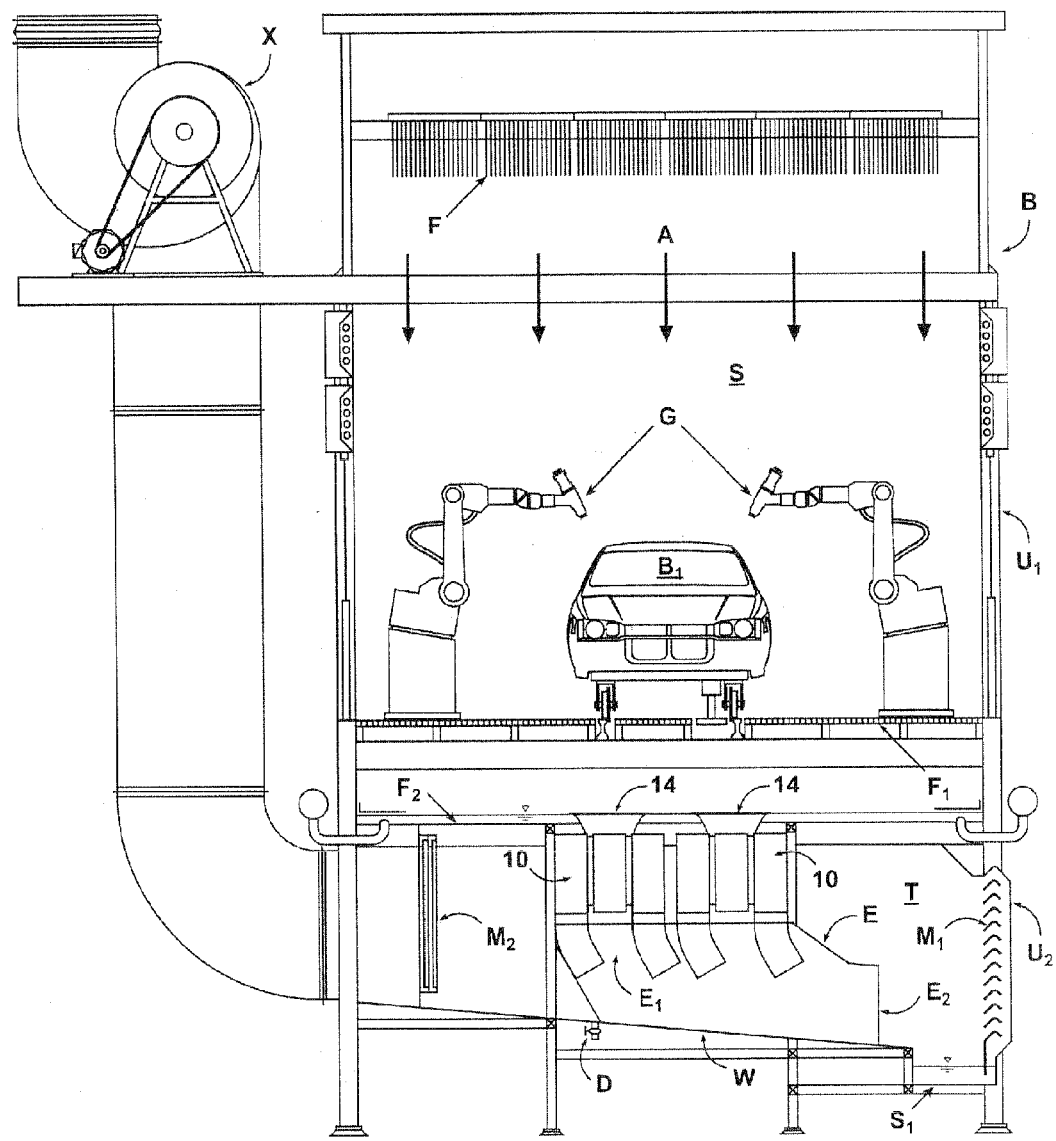
FIG. 1 is a cutaway schematic view of a representative paint spray booth utilizing one embodiment of a scrubber of the present invention.

FIGS. 1-3, and 5a-c illustrate one embodiment of the fluid or wet scrubber 10 of the present invention. FIG. 1 illustrates a representative downdraft paint spray booth B utilizing one embodiment of the wet scrubber 10 of the present invention. Typical automotive spray booths are manufactured in modular sections that are repeated lengthwise to create the complete booth. The following discussion may relate to one of these sections.

As shown, the paint spray booth B includes an upper or spraying section $U_1$ and an under or capturing section $U_2$. The upper section $U_1$ is in fluid communication with an air supply A, such as ambient air blown in from outside the booth. Some of this air A is forced through filters F at a desired rate and directed to a spraying area S that contains a plurality of paint spray guns G. As an object, such as an automobile body $B_1$, enters the spraying area S, the paint spray guns G are activated to deliver paint to the body $B_1$.

During this spraying, paint that does not stick to the body $B_1$ floats in the air A as paint mist. With the assistance of an exhaust fan assembly X, the flowing air A and paint mist are directed from the upper section $U_1$, through a floor grating $F_1$ and a flooded floor $F_2$, towards an inlet 14 of the wet scrubber 10, discussed below in further detail. Preferably, depending on the amount of air flow handled by the booth, the paint spray booth B includes two wet scrubbers 10 per booth section for maximizing the efficiency of the system. However, the booth B may have any number of scrubbers 10 per booth section. In the configuration shown, the inlet 14 is sealingly mounted to the flooded floor $F_2$, thereby providing the only exit path for the flowing air A entrained with paint. Accordingly, a mixture of water from the flooded floor $F_2$ and air entrained with paint particles enters the inlet 14 of the wet scrubber 10. After the flowing air A and water exit the wet scrubber 10, an exhaust enclosure E further directs the air A and helps with controlling splash of the water. Ideally, the water containing some of the paint particles captured in the wet scrubber 10 flows along a wall W of the exhaust enclosure E into a sluice $S_1$. The exhaust enclosure E may be tapered. For instance, the width of the cross-section at an inlet $E_1$ may be smaller than that of the cross-section of an outlet $E_2$. From the sluice $S_1$ the water may be collected for treatment and recycling or disposal, as desired.

Ideally, the air A exiting the scrubber and the exhaust enclosure E is free of paint particles and all paint particles are trapped in the water exiting the scrubber. However, air A exiting the exhaust enclosure E may have a minimal amount of paint particles and water droplets suspended therein. To capture the residual water droplets, the air A may proceed through a plurality of baffles, sometimes referred to as a mist eliminator $M_1$ and $M_2$, whereby the paint particles and water droplets may further collect. Mist eliminators $M_1$ and $M_2$ are different in terms of the operational principle. $M_1$ is a tangential mist eliminator designed to control any splash generated on top of the sluice $S_1$. $M_2$ collects water droplets while the airflow crosses through them. Finally, the air A may be directed through a final exhaust filter or filter system before it is exhausted into the surrounding environment.

Further discussing one embodiment of the wet scrubber 10 forming one aspect of the present invention, with reference to FIGS. 2a, 2b, 3a and 3b, it includes a conduit 12 having the inlet 14, a mixing chamber 16, a vortex chamber 18, and a diffuser 20. As best shown in FIGS. 2a and 2h, the conduit 12 comprises a substantially square cross-section with the inlet 14 positioned at one end and the outlet 22 at the other end. Preferably, the conduit 12 is positioned in substantially the center of the wet scrubber 10 to provide optimal delivery of air entrained with paint and water to the mixing and vortex chambers (16 and 18, respectively). Proceeding from the inlet 14 to an outlet 22, the conduit 12 has a decreasing cross-sectional area. This change in dimension results in the speed of the air flow increasing as it proceeds through the conduit 12. The outlet 22 may have one or more adjustable plates 23a and 23b to optimize the speed of the air entrained with paint that exits the outlet 22. As shown, the adjustable plates may move in the direction β.

Although disclosed in this embodiment (see FIG. 3a) as having a substantially square cross-section, the inlet 14 may have any shape. For instance, as shown in FIG. 3b, it may have a substantially conical profile, thereby giving the inlet a circular cross-section (as discussed in Applicant's U.S. Pat. Nos. 6,024,796 and 6,093,250, herein incorporated by reference).

As previously mentioned, the scrubber 10 is positioned adjacent to the water supply of the flooded floor $F_2$. This water assists with the capture of the paint particles and enters the conduit 12 through the inlet 14. The water flows down interior surfaces of walls 24 of the conduit 12, while the air entrained with paint particles proceeds in a similar direction. Due to the acceleration of the air going through the conduit 12, the water flowing on the interior surfaces of walls 24 starts breaking into droplets and begins mixing with the air. The air and water continue down the conduit 12, exit the outlet 22, and enter a mixing chamber 16. To further accelerate the air and water, as well as to provide means to adjust to different operational conditions, a pair of adjustable plates 23a and 23b may be positioned adjacent to, and in flow communication with, outlet 22 of conduit 12.

The mixing chamber 16 includes an impingement pool 26 positioned adjacent to the outlet 22 of the conduit 12. Water flowing down the conduit 12 is collected in this pool 26. The air proceeding down the conduit 12 strikes this water, thereby mixing with the water. Because of the turbulence created by this mixing, some of the paint particles in the air become transferred to the water and stay suspended therein. Hence, the water serves to "trap" some of these particles.

To increase this turbulence and assist with substantially evenly diverting the air into the vortex chambers (discussed below), the mixing chamber 16 may include a divider 28, such as a flow divider, which also provides stability to the flow inside the scrubber 10. As shown in FIG. 2a, the divider 28 comprises joined curved surfaces 30a, 30b of the impingement pool 26, such that the apex of the divider 28 substantially forms a line having a width $W_1$ (see FIG. 2b), which may be substantially equal to the width at the outlet 22. Accordingly, at least a portion of the air and water that exits the outlet 22 engages the divider 28 and/or the curved surfaces 30a, 30b. Ideally, the divider 28 would substantially evenly divide the air, thus providing a similar amount of air to each vortex chamber 18. This helps to create a stable system which further increases efficiency and saves energy. Besides dividing the supply of air and water, the divider 28 causes further mixing of the air and water in the impingement pool 26, thereby increasing the mixing of these fluids and trapping more paint particles in the water.

The principle by which the flow divider 28 placed at the center of the impingement pool 26 may assist particulate capturing while pre-conditioning the mixture that enters the vortex chambers 18 is explained next. As described earlier, when entering the conduit 12 through the inlet 14, the water coming from the flooded floor $F_2$ runs as a film over the internal surfaces of walls 24 of conduit 12, while the paint laden air flows mainly through the center region of conduit 12. Due to acceleration of the air in conduit 12, the water film is broken into droplets that penetrate into the center region of the conduit 12 where the air is flowing. However, it is possible that, at outlet 22, segregated regions containing air entrained with overspray and a partially broken water film would still exist at the central and peripheral regions of the flow, respectively. The divider 28 further enhances capturing by bisecting these segregated regions and reversing their relative locations. For example, after being acted upon by the divider 28, the region containing paint laden air enters the vortex chamber at the peripheral region while the water film enters the chamber at the center region. Therefore, the paint laden air is "sandwiched" between the water film and the water contained at the bottom of the impingement pool 26 of the mixing chamber 16. Since water is roughly three orders of magnitude heavier than air, as soon as the sandwiched region enters the vortex chambers 18, the centrifugal force exerted squeezes the air and forces it through the water, hence, providing contact between the particles in the air and the water and, therefore, enhancing capturing.

With reference to FIG. 2a, the wet scrubber 10 includes two vortex chambers 18 symmetrically positioned about the line Y-Y. As shown, the vortex chambers 18 are substantially cylindrical, each having an inner wall surface 32. Upon entering the vortex chambers 18, the air and some of the water from the impingement pool and/or the outlet 22, begin to circulate. Given the geometry of the vortex chambers 18, the air/water mixture rotates around the chamber, thereby forming vortices. These vortices cause heavier particles, such as paint particles and water droplets, to move toward the periphery of the vortex chambers 18 and displace smaller droplets toward the center of the vortex where they stay colliding with other small droplets until they are big enough to precipitate to the periphery of the chamber 18. As these heavier particles contact one another, they join to form bigger particles. Specifically, the centrifugal force on the air/water mixture propels large water droplets and paint particles toward the inner wall surface 32 of the vortex chamber 18, which is covered with a water film. As the paint particles collide with the water on this surface, they become trapped in the water.

With reference to FIGS. 2a and 2b, the vortex chambers 18 may include a projection or protrusion, such as a rib 34, projecting from the inner wall surface 32 of each cylinder. As shown, the rib 34 extends less than halfway around the periphery of each vortex chamber 18; however, the rib 34 may have a longer extension. Preferably, the rib 34 is attached approximately midway along the length of the vortex chamber 18 between end caps 36 of the vortex chambers 18. This results in the rib 34 dividing the vortex chamber 18 into substantially equal sized sub-chambers 18a and 18b (FIG. 2b). The rib 34 functions in a way similar to that of flow divider 28 by dividing the volume of air entering sub-chambers 18a and 18b equally, thereby further stabilizing the vortex and enhancing capturing. Due to the high speed circulation flow in the vortex chambers 18, the region at its center (the central vortex) has the lowest pressure. To reduce the pressure drop through the scrubber (that is, the difference between the pressure values at the inlet and outlet of the scrubber), this lowest pressure has to be returned to a higher pressure value at the exit, hence, recovering pressure energy. By conservation of energy, this pressure recovery process is achieved by smoothly decelerating the flow that exits the scrubber. This deceleration has to be done in such a way that no substantial recirculations appear at the outlet of the scrubber.

After the air/water mixture goes through the vortex chambers 18 it enters the diffuser 20. As shown in FIGS. 2a, 2b and 5a-c, a plurality of diffusers 20 are positioned on the wet scrubber 10. Preferably, one would be positioned at each end of each vortex chamber 18. Unlike previous wet scrubbers having spiral shaped volute exhausts with increasing cross-section in the direction of discharge (FIGS. 4a and 4b), the diffusers 20 include a plurality of curved surfaces 38 extending away from the vortex chamber 18. In other words, the surfaces 38 forming the diffuser are curved in a different direction than the curvature of the vortex chambers 18. Unlike previous volute exhausts, this difference in curvature helps to prevent the exhausted air from recirculating back into the vortex chambers, thereby resulting in a more efficient scrubber. Since the higher speed flow runs close to the peripheral regions of the vortex chamber, the different curvature helps decelerate the flow in that region to better equalize the speed of the flow exiting the scrubber 10.

Figure 4A:
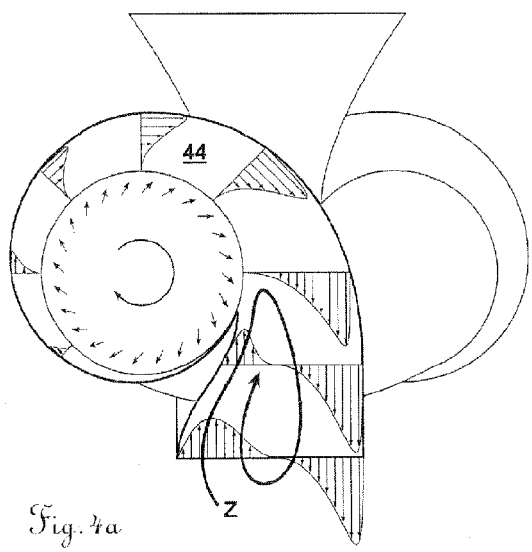
FIGS. 4a and 4b are cutaway schematic views showing the airflow and back flow in the volutes of previous wet scrubbers.
Figure 4B:
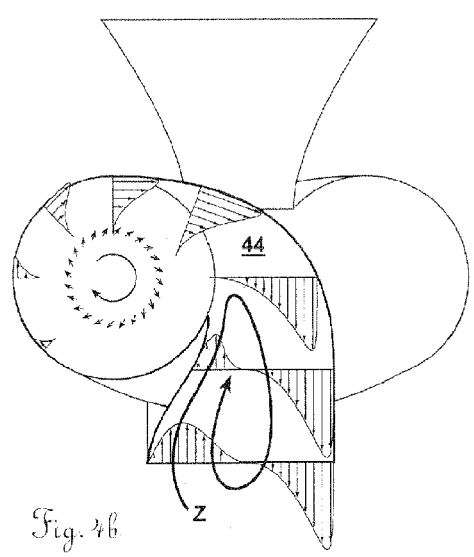

FIGS. 4a and 4b show the air flow patterns of the previous wet scrubbers utilizing the volute exhaust 44. The line Z shows the back flow (or recirculation) of the exhaust in these configurations. Recirculations waste valuable pressure energy propelling and sustaining the movement of the recirculating mass of fluid. However, when these recirculations penetrate the volute and reach and perturb the flow in the vortex chambers, not only is pressure energy not recovered, capturing performance is reduced. Volutes 44 used in previous scrubbers fail to efficiently recover pressure energy and reduce capturing performance because they allow recirculations at the scrubber exit that extend inwardly and perturb the capturing vortex flow in the chambers.

Figure 5A:
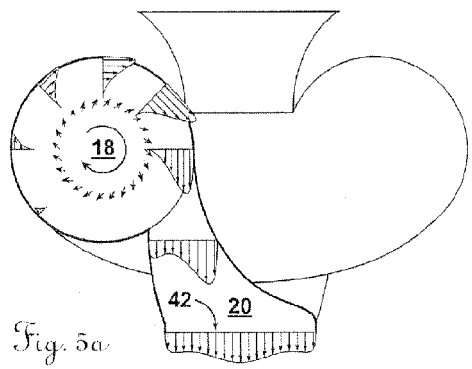
FIGS. 5a, 5b and 5c are cutaway schematic views showing the airflow in the diffusers of a scrubber of the present invention.
Figure 5B:
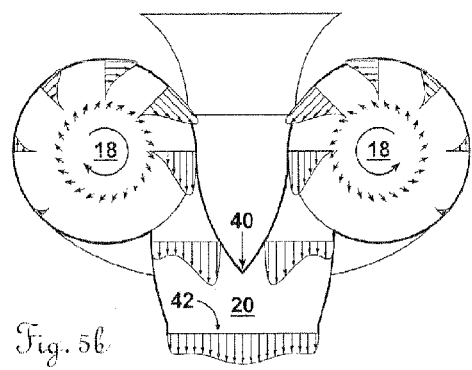
Figure 5C:
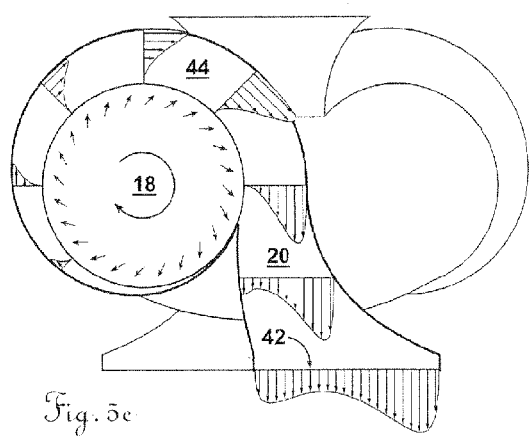

In contrast, FIGS. 5*a-c* show the air flow utilizing several typical embodiments of the present wet scrubber 10 and diffusers 20. FIG. 5*a* shows a single diffuser (one-sided diffuser) case. This type of diffuser is preferably used at the end of vortex chambers 18 that do not have a rib 34. As the air/water mixture exits the vortex chamber 18, the speed of the flow near the external periphery is substantially higher than that of the central regions. The curvature of the surfaces 38 of diffuser 20 (shaped contrary to those of volutes) allows for the smooth deceleration of the airflow in the periphery to equalize the speed of the flow at the diffuser exit, thus, minimizing or avoiding any recirculation and, hence, improving pressure energy recovery.

FIG. 5*b* displays a double diffuser (two-sided diffuser). This type of diffuser is used preferably with or without a rib 34 placed at the center of the vortex chamber 18, which divides it into sub-chamber 18*a* and 18*b*. As the air exits from both vortex chambers 18, the double diffuser 20 directs the air together at the point 40, whereby the air collides and further mixes in an exhaust mixing chamber. This provides another opportunity for paint particles to become trapped with water droplets in the air. When the air flowing through the double diffuser branches (one coming from each vortex chamber 18) meet at point 40, the air streams collide creating a turbulent mixing. This collision results in the air streams expanding away (or bouncing back), making the exhaust air flow reaching exit 42 more uniform, which, in turn, helps transform the air's kinetic energy into pressure energy, thus, enhancing pressure recovery and, therefore, reducing the effective pressure drop through the scrubber. After the air collides, it exits the wet scrubber through the exhaust 42 (FIG. 5*b*) without any back flow. In addition to substantially eliminating back flow of the air, this configuration of diffusers positioned at the ends of the vortex chamber 18 also increases the scrubbing efficiency. Specifically, because the air entrained with paint resides in the vortex chamber 18 for a longer period of time, there is greater chance for collision of the particles.

FIG. 5*c* presents a combination of a low expanding pitch volute and a diffuser with inverse curvature located at the end. This combination attempts to use the advantages of both. The volute decelerates the flow but still preserves high speed regions at the periphery. The diffuser located at the end completes the deceleration (pressure recovery) process but prevents detrimental recirculation at the exhaust of the scrubber.

The foregoing descriptions of various embodiments of the invention are provided for purposes of illustration, and are not intended to be exhaustive or limiting. Modifications or variations are also possible in light of the above teachings. For example, although discussed as being a flooded floor $F_2$ using water, this may be any liquid (e.g., solvents, water/solvent combinations, or other). The configuration of the flooded floor $F_2$ may be changed to include troughs $F_3$ (see FIG. 6) and sloped floor (not shown). Although shown in FIG. 1 with two wet scrubbers 10, the paint spray booth B may include any number of wet scrubber 10 mounted in any configuration. Instead of the substantially vertical positioning shown, the wet scrubber 10 could be mounted horizontally or otherwise. Also, the wet scrubber 10 may have any number and configuration of vortex chambers 18. For instance, instead of the two shown, the vortex chambers 18 may be combined into a single chamber. Also, the under section $U_2$ may include any number of mist eliminators $M_1$ and $M_2$. The mist eliminators $M_1$ and $M_2$ may also be positioned at any location. For instance, one may be positioned directly adjacent an outlet O of the under section $U_2$ (FIG. 8*a*). In another embodiment shown in FIG. 7, the mist eliminator $M_1$ is positioned over the sluice $S_1$. In this configuration, there is little or no pressure drop.

The wet scrubber 10 may also include any number of exhaust extensions 45 (FIGS. 2*a* and 2*b*) attached to the exhaust 42. As shown, these exhaust extensions comprise a curved conduit for directing the exhaust in a desired direction and/or moderating the exhaust. The conduit may have a uniform cross-section or a changing cross-section to further recover pressure, reducing the overall pressure drop. Eliminating or modifying these exhaust extensions allows for the overall dimensions of the wet scrubber 10 to be modified. Additionally, one may modify the length of the conduit 12 and the dimensions of the mixing chamber 16 and vortex chamber 18, as desired. Also, the under section tank T and the scrubbers 10 may also have one or more drains D (under section tank T drain shown in FIG. 1, scrubber drain not shown) and one or more access doors $D_1$ (see FIG. 6) for accessing the interior of the under section tank T and the enclosure E (e.g., when cleaning the tank and the enclosure). One will appreciate that instead of the single exhaust enclosure E, multiple exhaust enclosures may be provided. Furthermore, the end caps 36 may have one or more access doors (not shown) for accessing the interior of the wet scrubber 10 (e.g., when cleaning the interior of the scrubber).

Figure 6:
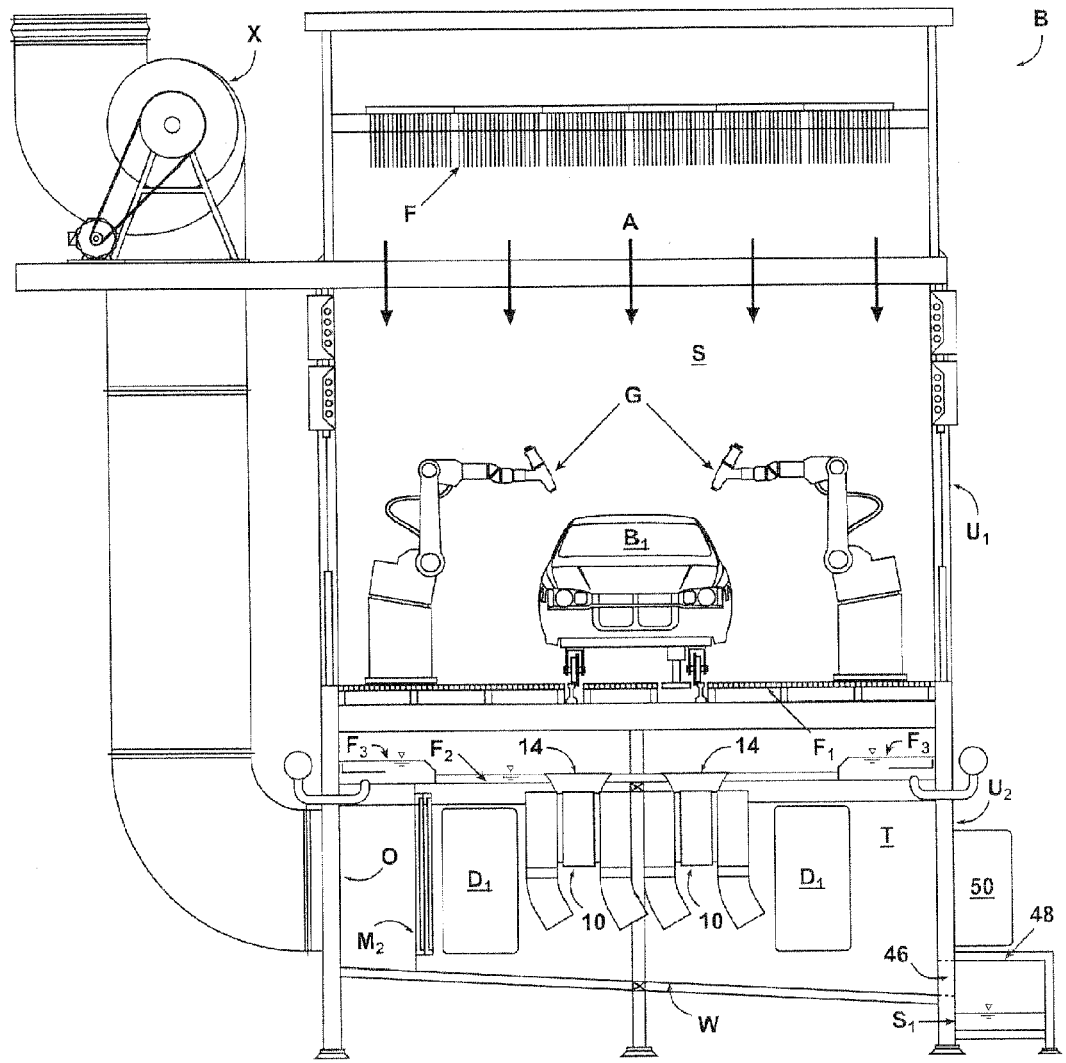
FIG. 6 is a cutaway schematic view of a representative paint spray booth utilizing one embodiment of a scrubber of the present invention.
Figure 7:
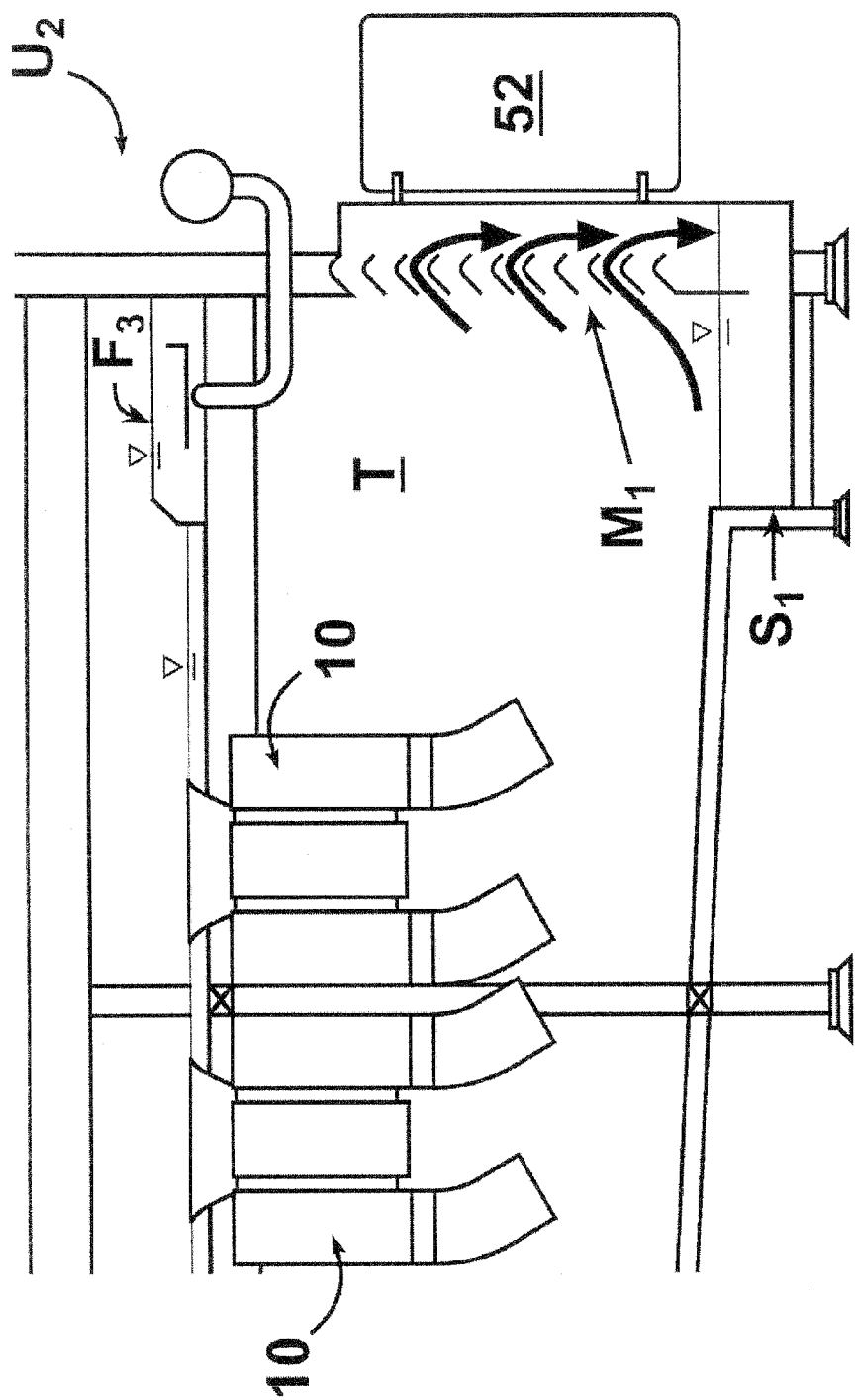
FIG. 7 is a partial cutaway schematic view of one embodiment of an under section of the present invention.

Also, the sluice $S_1$ may be positioned anywhere in relation to the scrubber 10 and/or the spray booth B. In one embodiment shown in FIG. 6, the sluice $S_1$ is positioned outside the under section tank T. As shown, the under section tank T includes an opening 46 to allow water containing the paint particles to exit the under section tank T and enter the sluice $S_1$. Positioning the sluice $S_1$ in this manner (forming one aspect of the present invention) may assist with preventing material in the sluice $S_1$ from being disrupted and reintroduced into the air in the under section $U_2$. As shown in FIG. 6, the sluice $S_1$ positioned outside the under section tank T may have one or more access doors 48 for accessing the sluice $S_1$, when desired (such as when cleaning the sluice). Similarly, instead of one sluice $S_1$ as shown in FIGS. 1 and 6, multiple sluices $S_1$ may be provided.

As also shown in FIG. 6, the under section tank T may include one or more access doors 50 for accessing the scrubber 10 or other components in the under section tank T of the spray booth B. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A wet scrubber for scrubbing a fluid, comprising: an inlet for receiving the fluid; at least one vortex chamber, in communication with the inlet, for causing at least a portion of the fluid to circulate; and at least one diffuser for exhausting the fluid from the vortex chamber, the diffuser being configured to define a curvature that is inverse to a curvature defined by the at least one vortex chamber to substantially prevent fluid exhausted from the diffuser from recirculating back into the diffuser.

2. The wet scrubber of claim 1, wherein the vortex chamber is substantially cylindrical and one diffuser is positioned at an end of the vortex chamber.

3. The wet scrubber of claim 1, wherein the vortex chamber includes a projection for dividing the vortex chamber into two sub-chambers.

4. The wet scrubber of claim 3, wherein the sub-chambers are substantially equal sized and each of the at least one diffuser is in communication with a separate sub-chamber.

5. The wet scrubber of claim 1, further comprising a mixing chamber having an impingement pool located between the inlet and the vortex chamber.

6. A wet scrubber for scrubbing a fluid, comprising: an inlet that receives the fluid; first and second vortex chambers, in communication with the inlet, for causing at least a portion of the fluid to circulate, wherein each vortex chamber includes a first outlet arranged such that fluid exiting the outlet of the first vortex chamber engages fluid exiting the outlet of the second vortex chamber; and a diffuser for exhausting the fluid from the first and second vortex chambers, the diffuser being configured to define a curvature that is inverse to a curvature defined by the first and second vortex chambers to substantially prevent fluid exhausted from the diffuser from recirculating back into the diffuser.

7. The wet scrubber of claim 6, wherein the first and second vortex chambers are substantially cylindrical and the outlets are positioned at an end of each vortex chamber.

8. The wet scrubber of claim 7, wherein each vortex chamber includes a second outlet, wherein the first and second outlets are positioned at different ends of the vortex chamber.

9. The wet scrubber of claim 6, further comprising a projection in each vortex chamber, each projection dividing the vortex chamber into substantially equal sized sub-chambers.

10. The wet scrubber of claim 6, further comprising a mixing chamber in communication with the inlet and the first and second vortex chambers.

11. The wet scrubber of claim 10, wherein the mixing chamber includes a divider for dividing the fluid prior to entering the first and second vortex chambers.

12. The wet scrubber of claim 11, wherein the mixing chamber includes an impingement pool for collecting a portion of the fluid that enters the inlet.

13. A wet scrubber, comprising: a conduit having an inlet that receives a fluid and an outlet; a mixing chamber for receiving fluid from the outlet of the conduit, the mixing chamber including a pool for receiving a portion of the fluid; two vortex chambers in communication with the mixing chamber, each of the vortex chambers including a projection for dividing each vortex chamber into two sub-chambers; and a diffuser in communication with each sub-chamber, each said diffuser being configured to define a curvature that is inverse to a curvature defined by the two vortex chambers to substantially prevent fluid exhausted from the diffusers from recirculating into the diffusers.

14. The wet scrubber of claim 13, wherein the conduit is positioned substantially in a center of the wet scrubber.

15. The wet scrubber of claim 13, wherein the mixing chamber includes a divider for dividing the fluid.

16. The wet scrubber of claim 15, wherein the divider has a width substantially equal to the width of the outlet of the conduit.

17. The wet scrubber of claim 13, wherein each vortex chamber is substantially cylindrical and the diffusers are positioned to enable fluid exiting each sub-chamber to engage fluid exiting one of the other sub-chambers.

18. The wet scrubber of claim 17, further comprising an exhaust in communication with at least one of the diffusers to direct the fluid away from the wet scrubber.

19. The wet scrubber of claim 18, further comprising an exhaust extension for directing the fluid exiting the exhaust in a direction away from the wet scrubber.

20. A paint booth, comprising: a spraying section where paint is directed toward an object; and a capturing section communicating with the spraying section and including at least one wet scrubber comprising: an inlet that receives a fluid containing paint particles; first and second vortex chambers, each in communication with the inlet, for causing at least a portion of the fluid to circulate, wherein each vortex chamber includes an outlet, such that fluid exiting the outlet of the first vortex chamber engages fluid exiting the outlet of the second vortex chamber; and at least one diffuser for exhausting the fluid from the first and second vortex chambers, the diffuser being configured to define a curvature that is inverse to a curvature defined by the first and second vortex chambers to substantially prevent fluid exhausted from the diffuser from recirculating back into the diffuser.

21. The paint booth of claim 20, further comprising an exhaust enclosure that encloses an exhaust of the wet scrubber and receives fluid from the exhaust.

22. The paint booth of claim 21, further comprising a sluice for receiving fluid from the exhaust enclosure.

23. A method of scrubbing a fluid containing paint particles, comprising: directing the fluid to first and second vortex chambers of a wet scrubber; causing the fluid to circulate within the first and second vortex chambers; directing fluid from the first and second vortex chambers to a point where the fluid from the first vortex chamber engages fluid from the second vortex chamber to cause further mixing of the fluid; and directing the fluid from the first and second vortex chambers to at least one diffuser for exhausting the fluid from the first and second vortex chambers, the diffuser defining a curvature that is inverse to a curvature defined by the first and second vortex chambers to substantially prevent fluid exhausted from the diffuser from recirculating back into the diffuser.

24. The method of claim 23, further comprising the step of mixing the fluid prior to the directing the fluid to the first and second vortex chambers.

25. The method of claim 24, further comprising the steps of: dividing the fluid prior to directing the fluid to the first and second vortex chambers; and further dividing the fluid after the fluid enters the first and second vortex chambers.

* * * * *